United States Patent
Uemura

(10) Patent No.: US 12,230,416 B2
(45) Date of Patent: Feb. 18, 2025

(54) METHOD FOR MANUFACTURING ELECTRICALLY-CONDUCTIVE PASTE

(71) Applicant: SANYO COLOR WORKS, Ltd., Hyogo (JP)

(72) Inventor: Yu Uemura, Hyogo (JP)

(73) Assignee: SANYO COLOR WORKS, Ltd., Hyogo (JP)

( * ) Notice: Subject to any disclaimer, the term of this patent is extended or adjusted under 35 U.S.C. 154(b) by 0 days.

(21) Appl. No.: 18/039,940

(22) PCT Filed: Oct. 22, 2021

(86) PCT No.: PCT/JP2021/039095
§ 371 (c)(1),
(2) Date: Jun. 1, 2023

(87) PCT Pub. No.: WO2022/118562
PCT Pub. Date: Jun. 9, 2022

(65) Prior Publication Data
US 2023/0420155 A1    Dec. 28, 2023

(30) Foreign Application Priority Data

Dec. 4, 2020    (JP) ................................ 2020-202304

(51) Int. Cl.
| | | |
|---|---|---|
| *C01B 32/168* | (2017.01) | |
| *H01B 1/04* | (2006.01) | |
| *H01M 4/62* | (2006.01) | |
| *H01M 10/0525* | (2010.01) | |
| *H01M 4/02* | (2006.01) | |

(52) U.S. Cl.
CPC ............. *H01B 1/04* (2013.01); *C01B 32/168* (2017.08); *H01M 4/625* (2013.01); *H01M 10/0525* (2013.01); *H01M 2004/028* (2013.01)

(58) Field of Classification Search
CPC ............. C01B 32/168; C01B 2202/22; C01B 2202/28; H01B 1/04; H01B 13/00; H01M 10/0525
USPC ........................ 252/502, 510, 511; 977/742
See application file for complete search history.

(56) References Cited

U.S. PATENT DOCUMENTS

| 9,595,714 | B2 | 3/2017 | Fouda Onana et al. |
| 10,519,333 | B2 | 12/2019 | Hladik |
| 10,868,298 | B2 | 12/2020 | Wang et al. |
| 2006/0274049 | A1* | 12/2006 | Spath ................ B82Y 10/00 428/419 |
| 2018/0126350 | A1* | 5/2018 | Kang .................. C01B 32/168 |

FOREIGN PATENT DOCUMENTS

| CN | 104411632 B | * 12/2016 | ............. B82Y 30/00 |
| JP | 5628503 B2 | 11/2014 | |
| JP | 2015-72899 A | 4/2015 | |
| JP | 6258215 B2 | 1/2018 | |
| JP | 6445585 B2 | 12/2018 | |
| JP | 6454267 B2 | 1/2019 | |
| JP | 2019-140105 A | 8/2019 | |
| JP | 2019-172485 A | 10/2019 | |
| WO | 2016/203746 A1 | 12/2016 | |
| WO | 2019/188023 A1 | 10/2019 | |
| WO | WO-2020100842 A1 | * 5/2020 | |

OTHER PUBLICATIONS

Hondo CN104411632B translation (Year: 2016).*
International Search Report and Written Opinion; Application No. PCT/JP2021/039095; dated Jan. 11, 2022 (partial translation).

* cited by examiner

*Primary Examiner* — Tri V Nguyen
(74) *Attorney, Agent, or Firm* — Fitch, Even, Tabin & Flannery LLP

(57) ABSTRACT

A method for manufacturing an electrically-conductive paste includes: bringing carbon nanotubes (CNT) and a solvent into contact with each other so that a wetting rate is 25 to 125%; kneading, by using a planetary stirring machine, a mixture containing the CNT and the solvent obtained by impregnating the CNT with the solvent, to obtain a kneaded product in a paste state; and then performing dispersion processing on a dilution obtained by mixing a solvent into the obtained kneaded product.

3 Claims, No Drawings

METHOD FOR MANUFACTURING ELECTRICALLY-CONDUCTIVE PASTE

CROSS-REFERENCE TO RELATED APPLICATIONS

This application is a U.S. national phase application filed under 35 U.S.C. § 371 of International Application No. PCT/JP2021/039095, filed Oct. 22, 2021, which is based upon and claims the benefit of priority from the prior Japanese Application No. 2020-202304, filed Dec. 4, 2020.

FIELD OF THE INVENTION

The present invention relates to a method for manufacturing an electrically-conductive paste.

BACKGROUND OF THE INVENTION

Background Art

To date, carbon nanotubes (hereinafter, this may be referred to as "CNT"), etc., have been known as a substance excellent in properties such as electrical conductivity, thermal conductivity, and mechanical properties. In recent years, technologies for improving properties of various products such as films, fibers, and the like with use of CNT have been proposed. Specifically, a technology in which a product that contains CNT is manufactured by using, as a material, a CNT dispersion liquid that contains CNT and an organic solvent, thereby improving properties of the product, has been proposed.

In particular, in a positive electrode of a lithium-ion secondary battery, three materials, i.e., an active material, a binder, and an electric conduction aid, are used as main materials. Among these, the active material which accounts for 90% or higher of a positive electrode mixture has poor electric conductivity. Therefore, as an electric conduction aid for solving this problem, carbon black (acetylene black) has been used. However, in recent years, CNT which is excellent in electric conductivity when compared with carbon black has been attracting attention.

In order for CNT to effectively act as an electric conduction aid, CNT needs to be sufficiently dispersed in the active material. However, CNT has a characteristic of being easily aggregated, and being less likely to be dispersed. Therefore, in order to improve dispersibility of CNT, an attempt in which: a CNT dispersion liquid that contains CNT and a dispersant is produced in advance; and the CNT dispersion liquid is mixed with an active material, etc., has been performed. For example, Patent Literature 1 discloses a CNT dispersion liquid which has a CNT concentration of 2 to 30% and in which 30 to 200 parts by weight of a nonionic dispersant is used with respect to 100 parts by weight of CNT. However, when a dispersant is used, although CNT can be dispersed in the active material, there is a concern that, during operation of the battery, a side reaction is caused and adversely influences the battery properties and the safety. In addition, there is an unfavorable problem that the content ratios of the other active ingredients are decreased by the content of the dispersant.

In view of the above, production of a CNT dispersion liquid not using a dispersant as much as possible is also studied.

For example, a method that uses ultrasonic processing (Patent Literatures 2, 3), a method that uses a rolling mill (Patent Literature 4), a method that uses a colloid mill (Patent Literature 5), a method that uses a homogenizer or a wet jet mill (Patent Literature 6, 7), and the like are known.

CITATION LIST

Patent Literature

[PTL 1] Japanese Patent No. 5628503
[PTL 2] Japanese Patent No. 6258215
[PTL 3] Japanese Patent No. 6445585
[PTL 4] Japanese Patent No. 6454267
[PTL 5] Japanese Unexamined Patent Application Publication No. 2019-172485
[PTL 6] International Publication No. WO2016/203746
[PTL 7] International Publication No. WO2019/188023

SUMMARY OF THE INVENTION

Problems to be Solved by the Invention

In order to disperse CNT at a high concentration without adding an extra component such as a dispersant as much as possible, it is necessary to disperse CNT with a reduced amount of a solvent. However, in a case where a disperser such as a sand mill, a jet mill, or a disper is used, there is a problem that the viscosity of the dispersion body is increased, which adversely influences the operation of the disperser, resulting in a longer time, and the like.

In the methods described in Patent Literatures 2, 3, 5, 6, and 7 above, since a solvent is necessary for providing a certain degree of fluidity, it is considered that there is a limitation in increasing the concentration. In particular, in ultrasonic processing, a homogenizer, a wet jet mill, and the like, a liquid medium is inevitable and dispersion in a paste state is difficult to be realized.

Meanwhile, Patent Literature 4 discloses a dispersion body having CNT at a high concentration. However, when the present inventor conducted follow-up studies, the viscosity of an obtained CNT dispersion body was substantially equivalent to the viscosity of CNT that was not dispersed. When the viscosity of the CNT dispersion body is very high like this, the fluidity of the dispersion body is bad, which makes it difficult to ensure workability, homogeneity, and coating properties of the mixture, resulting in difficulty in obtaining a uniform mixture electrode. In addition, it is also conceivable that CNT may be aggregated in the positive electrode mixture.

Then, further studies were conducted, and the following was found. CNT and a solvent are kneaded using a planetary stirring machine to prepare a kneaded product that contains CNT at a high concentration. Then, a dilution obtained by mixing a solvent into the obtained kneaded product is subjected to dispersion processing. Further, during production of the kneaded product, a wetting rate represented by the ratio between a CNT concentration based on the maximum penetration weight of the solvent per 1 g of CNT, and a CNT concentration based on the weight of the mixture containing the CNT and the solvent is adjusted to be in a specific range. As a result, an electrically-conductive paste containing the CNT at a higher concentration can be produced. In addition, aggregates of the CNT are less likely to be generated in the positive electrode mixture having the electrically-conductive paste mixed therein.

Therefore, an object of the present invention is to provide a method for manufacturing an electrically-conductive paste that: is usable in a positive electrode mixture for a lithium-ion secondary battery; contains CNT at a high concentration even when the amount of a dispersant is small; and has a low viscosity and is easy to handle.

A method for manufacturing an electrically-conductive paste, the method including:
bringing CNT and a solvent into contact with each other so that a wetting rate represented by a formula (1) below is 25 to 125%;
kneading, by using a planetary stirring machine, a mixture containing the CNT and the solvent, to obtain a kneaded product in a paste state, the mixture being obtained by impregnating the CNT with the solvent; and
performing dispersion processing on a dilution obtained by mixing a solvent into the kneaded product obtained, in which $$\text{the wetting rate }(\%)=A/B\times 100 \quad (1),$$

where A is a concentration of the CNT, when the solvent has penetrated to a maximum extent, and is calculated by a formula below, $$A\ (\%)=1\text{ g of the }CNT/(1\text{ g of the }CNT+\text{a maximum penetration weight [g] of the solvent per 1 g of the }CNT)\times 100,\text{ and}$$

B is a concentration of the CNT in the mixture, and is calculated by a formula below, $$B\ (\%)=\text{a weight of the }CNT[\text{g}]/\text{a weight of the mixture [g]}\times 100.$$

In the embodiment of the present invention, a content of a dispersant in each of the mixture, the kneaded product, and the dilution may be less than 30 parts by weight with respect to 100 parts by weight of the CNT.

In the embodiment of the present invention, the dispersion processing may be performed by at least one of: a stirring machine that rotates a stirring blade at a high speed, thereby applying a shearing force to the dilution; and a stirring machine that causes, while mechanically stirring a natural or synthetic medium in a container filled with the medium, the dilution to flow back or pass through the medium to be dispersed.

In the embodiment of the present invention, a solvent may be further mixed into the dilution having been subjected to the dispersion processing, to adjust the concentration of the CNT.

In the electrically-conductive paste obtained in the present invention, the content of the dispersant is small. Therefore, there is no concern about a side reaction due to the dispersant during operation of the battery. The content ratios of the active ingredients (an active material, a binder, and an electric conduction aid other than CNT) in the positive electrode mixture can be increased by the small content of the dispersant. The electrically-conductive paste obtained in the present invention has a viscosity that allows easy handling, while having a high concentration of the CNT, and thus is easily blended into a positive electrode mixture. Further, the concentration of the CNT is easily adjusted. Accordingly, it is possible to efficiently manufacture a desired electrode member excellent in electron conductivity.

For example, the electrically-conductive paste obtained in the present invention is very excellent in dispersibility of CNT in an active material. Therefore, when the electrically-conductive paste is added and mixed into a positive electrode mixture, discharge capacity can be significantly improved. Further, the electrically-conductive paste obtained in the present invention does not require a dispersant as an essential component. Therefore, the contents of other components such as an active material, a binder, an electric conduction aid, and the like can be increased, and development of electrode members according to various properties can be promoted.

DESCRIPTION OF EMBODIMENTS

Hereinafter, an embodiment of a method for manufacturing an electrically-conductive paste according to the present invention will be described.

A method for manufacturing (hereinafter, also referred to as "manufacturing method of the present invention") an electrically-conductive paste according to the embodiment of the present invention includes:
bringing CNT and a solvent into contact with each other so that a wetting rate represented by a formula (1) below is 25 to 125%;
kneading, by using a planetary stirring machine, a mixture containing the CNT and the solvent, to obtain a kneaded product in a paste state, the mixture being obtained by impregnating the CNT with the solvent; and
performing dispersion processing on a dilution obtained by mixing a solvent into the kneaded product obtained, in which $$\text{the wetting rate }(\%)=A/B\times 100 \quad (1),$$

where A is a concentration of the CNT, when the solvent has penetrated to a maximum extent, and is calculated by a formula below, $$A\ (\%)=1\text{ g of the }CNT/(1\text{ g of the }CNT+\text{a maximum penetration weight [g] of the solvent per 1 g of the }CNT)\times 100,\text{ and}$$

B is a concentration of the CNT in the mixture, and is calculated by a formula below, $$B\ (\%)=\text{a weight of the }CNT[\text{g}]/\text{a weight of the mixture [g]}\times 100.$$

In the present invention, the electrically-conductive paste can be used as an electric conduction aid for a positive electrode mixture for a lithium-ion secondary battery, and contains the CNT and the solvent as main components.

The CNT used in the present invention is not limited in particular, and either a multi-wall CNT (MWCNT) or a single-wall CNT (SWCNT) can be used. The number of multi-walls is not limited in particular, and a multi-wall CNT having two walls, three walls, four walls, five walls, or more can be used. Examples of the MWCNT having five walls or more include those having a diameter of 5 nm or more.

Examples of the MWCNT include MWCNTs manufactured by companies such as Showa Denko K. K., Cnano, Nanocyl, LG Chem, JEIO, Kumho Petrochemical, SUSN Sinotech New Materials, ARKEMA, and the like, but are not limited thereto in particular.

Examples of the SWCNT include SWCNTs manufactured by companies such as OCSiAl, OSAKA SODA CO., LTD., NanoIntegris, and the like, but are not limited thereto in particular.

In the present invention, one type of CNT may be singly used, or a plurality of CNTs may be mixed and used.

Examples of the solvent used in the present invention include: aprotic polar solvents such as N-methyl-2-pyrrolidone (NMP), dimethyl sulfoxide, and dimethylformamide; aliphatic hydrocarbon-based solvents such as pentane, n-hexane, octane, cyclopentane, and cyclohexane; aromatic hydrocarbon-based solvents such as benzene, toluene, xylene, and cymene; aldehyde-based solvents such as furfural; ketone-based solvents such as acetone, methyl ethyl ketone, cyclopentanone, and cyclohexanone; ester-based solvents such as butyl acetate, ethyl acetate, methyl acetate, butyl propionate, butyl butyrate, ethylene glycol monoethyl ether acetate, propylene glycol monomethyl ether acetate, 3-methoxybutyl acetate, and ethylene glycol diacetate; ether-based solvents such as tetrahydrofuran, dioxane, anisole, and ethylene glycol dimethyl ether; alcohol-based solvents such as methanol, ethanol, n-propyl alcohol, isopropyl alcohol, butyl alcohol, octyl alcohol, cyclohexanol, allyl alcohol, benzyl alcohol, cresol, and furfuryl alcohol; polyol-based solvents such as glycerol, ethylene glycol, and diethylene glycol; alcohol ether-based solvents such as ethylene glycol monomethyl ether, ethylene glycol monoethyl ether, ethylene glycol monobutyl ether, propylene glycol monomethyl ether, and diethylene glycol monobutyl ether; water; and the like, but are not limited thereto in particular. In addition, two or more types of the solvents can be used in combination.

The planetary stirring machine used in the present invention is a machine that performs mixing through material residence and a shear stress, which are caused by centrifugal force generated through rotation and revolution (planetary motion), and is also referred to as a rotation-revolution-type mixer.

As the planetary stirring machine, a commercially available manufacturing apparatus may be used, and the planetary stirring machine is not limited in particular.

In the manufacturing method of the present invention, the CNT and the solvent are first brought into contact with each other so that the wetting rate represented by the formula (1) is 25 to 125%, and a mixture that contains the CNT and the solvent and is obtained by impregnating the CNT with the solvent is kneaded by using a planetary stirring machine, to obtain a kneaded product in a paste state.

The wetting rate represented by the formula (1) is the ratio of (A) the CNT concentration when the solvent has penetrated to the maximum extent, with respect to (B) the CNT concentration in the mixture. The lower the wetting rate is, the lower the viscosity of the mixture becomes. The higher the wetting rate is, the higher the viscosity of the mixture becomes. 100% as the wetting rate denotes a state where the solvent has penetrated the CNT to the maximum extent.

In the present invention, since the wetting rate is adjusted so as to be 25 to 125%, a mixture in a paste state can be efficiently obtained while allowing the solvent to penetrate the CNT. Accordingly, a kneaded product having a low viscosity can be obtained, and the CNT can be dispersed at a high concentration in the subsequent dispersion processing. When the wetting rate is less than 25% or higher than 125%, the effect of reducing the viscosity in the kneaded product is less likely to be obtained.

Thus, the wetting rate represented by the formula (1) can be used to predict in advance an optimum dispersing manner for the electrically-conductive paste exhibiting the targeted effect in accordance with the types of the CNT and the solvent that are used, and thus is an excellent index.

In the formula (1), the range of a value of (B) the CNT concentration in the mixture is 0<B<100 according to the above definition. There is a relationship that the larger the value of B is, the more the wetting rate converges on A. This means that "even when the CNT concentration is close to 100%, the wetting rate does not become close to 0%".

The maximum penetration weight of the solvent per 1 g of the CNT can be measured by the procedures below.

1. A powder measurement penetration speed measurement apparatus "Peneto Analyzer", Peneto Analyzer dedicated jigs (a Teflon (registered trademark) cylinder, a stainless mesh, a filter paper, etc.), and a tapping device (all manufactured by HOSOKAWA MICRON CORPORATION) are prepared.
2. On the bottom of the Teflon (registered trademark) cylinder, the stainless mesh and the filter paper are laid, and on top of that, well-disentangled CNT is packed. The weight of the CNT is also precisely weighed (so as to ensure three or more digits of significant FIGURES).
3. Using the tapping device, the CNT is mechanically tapped. The tapping condition is according to the pigment tapped density measurement method (JIS K 5101-12-2). Specifically, the Teflon (registered trademark) cylinder having the CNT therein prepared in 2. is fixed to a tapping device support, and tapping is performed for five minutes at a nominal speed of 250 times/minute from a height of 3 mm±0.2 mm.
4. The CNT prepared in 3. is set to a scale part of the Peneto Analyzer, and a beaker storing a solvent to be used in dispersion is set to a base.
5. Measurement is started. When the CNT has come into contact with the solvent and begins to absorb the solvent, the penetration weight of the solvent is plotted with respect to time.

The measurement is continued until the penetration weight of the solvent is saturated. The penetration weight (maximum penetration weight) in a saturation region is read, and is divided by the weight of the CNT precisely measured in 2. in advance, whereby the maximum penetration weight of the solvent per 1 g of the CNT is obtained. The region where the solvent penetration speed (the slope of the plot) per 1 g of the CNT is 0.010 g/s or less is regarded as the saturation region.

In the present invention, from the viewpoint of being able to efficiently perform kneading, the lower limit of the wetting rate is preferably 25% or higher and more preferably 30% or higher, and the upper limit of the wetting rate is preferably 125% or lower and more preferably 100% or lower.

The amount of the CNT to be mixed with the solvent, in the present invention, depends on the types of the CNT and the solvent and thus cannot generally be specified. However, even when the amount of the CNT is adjusted to be 8.5% or higher by weight, for example, an electrically-conductive paste can be efficiently manufactured in a dispersion processing step to be performed next, without causing a viscosity failure (a state where the entirety of the paste is raised, and the stirring member of the disper spins idly).

The concentration of the CNT is preferably adjusted to a high viscosity (optimum viscosity) in a range where the viscosity failure does not occur.

Specifically, the following method can be exemplified. That is, according to the specifications (the shape of a stirring blade, the presence or absence of a baffle plate, the diameter and amount of beads serving as a medium, and the like) of the disperser to be used, a threshold for the viscosity at which the viscosity failure occurs is examined in advance. Then, a kneaded product is actually produced by using the CNT, and the viscosity is measured while the concentration thereof is changed. Then, a CNT concentration condition that falls within the range of the optimum viscosity is adopted as the present dispersion condition.

Although the measurement of the viscosity is not limited in particular, the viscosity can be measured by using an E-type viscometer, a rheometer, or the like.

In the present invention, examples of the method for bringing the CNT and the solvent into contact with each other include: a method in which a predetermined amount of the solvent is mixed into the CNT at once or is divided into a plurality of portions to be mixed into the CNT a plurality of times; and a method in which a predetermined amount of the CNT is mixed into the solvent at once or is divided into a plurality of portions to be mixed into the solvent a plurality of times, but the method is not limited in particular.

As a condition for kneading with the planetary stirring machine, the temperature only needs to be adjusted to be the boiling point or lower of the solvent to be used. The kneading processing time depends on the specifications of the planetary stirring machine and thus cannot be generally specified. However, the time at which the torque converges may be set to be the end point of the kneading. The condition is not limited in particular, but 0 to 80° C. and 1 to 24 hours are preferable.

The speed when the kneading is performed only needs to be about 30 rpm (30 min$^{-1}$), and is not limited in particular.

The filling rate for the planetary stirring machine may be adjusted as appropriate so as to enable efficient kneading, in accordance with the capacity of the tank and the loading amounts of the CNT and the solvent to be put therein. A specific filling rate is not limited in particular, and the filling rate may be adjusted so as to be 20 to 70%.

As for the state where the torque converges, the torque increases upon start of the kneading, the increase becomes gentle in association with progress of the dispersion, and when the kneaded product is sufficiently dispersed, the torque converges on a constant value. The torque may be confirmed using a monitoring function provided to the planetary stirring machine.

The present inventor confirmed the following. The CNT and the solvent might be kneaded with a general disper. In such a case, even if a dispersant was used, the viscosity of the kneaded product became high or the viscosity failure occurred, unless the CNT concentration was 4% or lower by weight. Accordingly, a good paste state could not be realized. In addition, even when the obtained kneaded product was mixed into a positive electrode mixture, the CNT was aggregated, or the CNT in the positive electrode mixture failed to be dispersed up to a desired state.

Meanwhile, in the manufacturing method of the present invention, kneading is first performed by using the planetary stirring machine, as in the present step. Accordingly, a kneaded product can be obtained without using a dispersant, even when the CNT concentration is adjusted to be high. Further, when a dispersant is used, a kneaded product having a higher CNT concentration can also be obtained.

The CNT concentration is not limited because the adjustable concentration is different depending on the CNT. However, even when a dispersant is not used, a kneaded product having a CNT concentration of 6% or higher by weight can be obtained, and when a dispersant is used, a kneaded product having a CNT concentration of 10% or higher by weight can be obtained.

In the manufacturing method of the present invention, dispersion processing is performed on a dilution obtained by mixing a solvent into the kneaded product. Through this dispersion processing, the CNT concentration is adjusted, whereby an electrically-conductive paste that allows, when mixed with the active material, the CNT to be dispersed in a favorable manner in the active material can be manufactured.

In the present dispersion processing step, a high-speed shearing device having a high shearing force is used. Examples of the high-speed shearing device include: a stirring machine that rotates a stirring blade (a turbine blade, a paddle blade, a propeller blade, an anchor blade, or the like) at a high speed, so as to apply a shearing force to a dilution; a disperser that causes a dilution to pass through a narrow gap between a high-speed rotary disk and a fixed disk, so as to apply a strong shearing flow and a large speed variation before and after thereof; a disperser that injects a dilution at a high pressure, so as to cause the dilution to collide against a fixed plate or to collide with each other; a disperser that has a medium such as balls in a rotation container or the like to apply a collision/friction force; a stirring machine (e.g., a bead mill manufactured by Ashizawa Finetech Ltd.) that causes, while mechanically stirring a natural or synthetic medium (e.g., natural sand, glass beads, or zirconia beads) in a container filled with the medium, the dilution to flow back or pass therethrough to be dispersed; and the like. Among them, from the viewpoint that the dispersion processing can be efficiently performed and metal contamination is less likely to occur, the stirring machine that rotates a stirring blade at a high speed, so as to apply a shearing force is preferable.

Two or more types of these high-speed shearing devices can be used in combination.

As a condition for performing dispersion processing by the high-speed shearing device, the temperature only needs to be adjusted to be the flash point or lower of the solvent to be used. The processing time depends on the specifications of the disperser and thus cannot be generally specified. However, the time at which the particle size distribution converges may be set to be the end point of the dispersion. An example of the condition is a range of 0 to 80° C. and 1 to 10 hours.

The speed when performing the dispersion processing only needs to be able to keep the fluidity of the content and is not limited in particular.

The amount of the solvent to be mixed into the kneaded product is preferably adjusted so that the viscosity in the dispersion processing is in a range where the viscosity failure does not occur.

The dispersion processing may be performed by using, for example, a stirring machine that rotates the stirring blade at a high speed so as to apply a shearing force to the dilution. In such a situation, if the shear viscosity at a shear speed of 10 s$^{-1}$ exceeds 15,000 mPa·s, the viscosity failure occurs. Therefore, the amount of the solvent is adjusted so that the shear viscosity is 15,000 mPa·s or less and more preferably around 10,000 mPa·s. Although depending on the CNT concentration of the kneaded product, the CNT concentration at this time may be adjusted to be the CNT concentration or less of the kneaded product within the range of 4 to 10% by weight, for example.

As the solvent to be used in the present dispersion processing step, the solvent used in the kneaded product may be used or another solvent may be used. A type of the solvent is not limited in particular, and any solvent usable in the kneaded product may be used.

In the manufacturing method of the present invention, the dispersant is not an essential component. However, from a viewpoint of adjusting the CNT concentration in the kneaded product to be high, and efficiently dispersing the electrically-conductive paste into the active material, the dispersant may be mixed in the electrically-conductive paste.

Examples of the dispersant include polyvinylidene fluoride, polytetrafluoroethylene, polyhexafluoropropylene, polyethylene, polypropylene, polymethyl methacrylate, polyvinyl chloride, polyvinylidene chloride, polyvinyl acetate, polyacrylic acid, polyvinyl butyral, polyacrylamide, polyurethane, polydimethylsiloxane, epoxy resin, acrylic resin, polyester resin, melamine resin, phenol resin, various rubbers, lignin, pectin, gelatin, xanthan gum, welan gum, succinoglycan, polyvinyl alcohol, polyvinyl acetal, cellulose-based resin, polyalkylene oxide, polyvinyl ether, polyvinylpyrrolidone, chitins, chitosans, starch, polyimide, and the like. These dispersants can be singly used, or two or more types thereof may be used in combination.

The dispersant may be mixed when the kneaded product or the dispersant is produced. The timing of the mixing is not limited in particular.

When the dispersant is used, from the viewpoint of making it difficult for a side reaction to occur during operation of the battery, the content of the dispersant in the mixture, the kneaded product, and the dilution is preferably adjusted so as to be low, and, for example, may be adjusted to be less than 30 parts by weight at most with respect to 100 parts by weight of the CNT.

A solvent is further mixed into the dilution having been subjected to the dispersion processing, so that the CNT concentration is adjusted, thereby making it possible to cope with positive electrode mixtures having various compositions.

The CNT concentration may be adjusted in a similar manner as in the dilution step.

The thus-obtained electrically-conductive paste, as an electric conduction aid, is mixed with an active material and a binder, thereby producing a positive electrode mixture for a lithium-ion secondary battery.

EXAMPLES

Example 1

Since the maximum penetration weight of NMP per 1 g of CNT 1 (MWCNT, manufactured by LG Chem, LUCAN BT 1003M. The same applies below) was 12.6 g, 100% of CNT 1 was wet (wetting rate: 100%) when the CNT 1 concentration was 7.4% by weight.

900 parts by weight of NMP with respect to 100 parts by weight of CNT 1 was supplied to a planetary stirring machine (manufactured by INOUE MFG., INC., product name "Trimix". The same applies below) so that the wetting rate of CNT 1 was 74% (CNT 1 concentration: 10.0% by weight). Then, the planetary stirring machine was operated at about 30° C. and 35 rpm (35 $min^{-1}$) for about six hours to perform kneading, whereby a kneaded product having a CNT 1 concentration of 10.0% by weight was obtained.

The obtained kneaded product in a paste state was subjected to dispersion processing in the following manner. 667 parts by weight of NMP with respect to 100 parts by weight of CNT 1 was added in a high-speed shear chamber (chamber inner diameter: 80 mm. The same applies below) so that the CNT 1 concentration was 6.0% by weight. Then, using, as the stirring blade, edged turbine blades (at the radially outer peripheral edge of the rotary plate having a diameter of 60 mm, six turbine blades raised to a height of 6 mm with respect to the axis direction of the drive shaft were provided at the upper and lower sides in the axis direction. The same applies below) and a three-phase induction motor (manufactured by Fuji Electric Co., Ltd., MLH8065M), the dispersion processing was performed by rotating the stirring blade at a high speed of 2000 rpm (2000 min') for two hours. As a result, a CNT 1 electrically-conductive paste was obtained without causing the viscosity failure (a slight failure-like state was observed, but the fluidity of the paste was consistently confirmed).

Next, NMP was added to the dilution having been subjected to the dispersion processing, and an electrically-conductive paste having a CNT 1 concentration of 4.0% by weight was obtained.

Example 2

A kneaded product in a paste state was obtained in a similar manner as in Example 1, and then, the CNT 1 concentration was adjusted to be 5.5% by weight. Then, dispersion processing was performed in the high-speed shear chamber with the stirring blade for two hours. As a result, a CNT 1 electrically-conductive paste was obtained without causing the viscosity failure. Thereafter, in a similar manner as in Example 1, an electrically-conductive paste having a CNT 1 concentration of 4.0% by weight was obtained.

Example 3

A kneaded product in a paste state was obtained in a similar manner as in Example 1, and then, the CNT 1 concentration was adjusted to be 4.5% by weight. Then, dispersion processing was performed in the high-speed shear chamber with the stirring blade for two hours. As a result, a CNT 1 electrically-conductive paste was obtained without causing the viscosity failure. Thereafter, in a similar manner as in Example 1, an electrically-conductive paste having a CNT 1 concentration of 4.0% by weight was obtained.

Example 4

Kneading was performed in the same manner as that in Example 1, except that 681 parts by weight of NMP with respect to 100 parts by weight of CNT 1 was loaded so that the wetting rate of CNT 1 was 58% (CNT 1 concentration: 12.8% by weight).

757 parts by weight of NMP with respect to 100 parts by weight of CNT 1 was added to the above obtained kneaded product (CNT 1 concentration: 12.8% by weight) in a paste state so that the CNT 1 concentration was 6.5% by weight, and then dispersion processing was performed by rotating the stirring blade at a high speed of 2000 rpm (2000 min') for two hours in the high-speed shear chamber. As a result, a CNT 1 electrically-conductive paste was obtained without causing the viscosity failure.

Next, NMP was added to the dilution having been subjected to the dispersion processing, and an electrically-conductive paste having a CNT 1 concentration of 6.0% by weight was obtained.

Example 5

Kneading was performed in the same manner as that in Example 1, except that 400 parts by weight of NMP with respect to 100 parts by weight of CNT 1 was loaded so that the wetting rate of CNT 1 was 37% (CNT 1 concentration: 20.0% by weight).

677 parts by weight of NMP with respect to 100 parts by weight of CNT 1 was added to the above obtained kneaded product (CNT 1 concentration: 20.0% by weight) in a paste state so that the CNT 1 concentration was 8.5% by weight, and then dispersion processing was performed by rotating the stirring blade at a high speed of 2000 rpm (2000 $min^{-1}$) for two hours in the high-speed shear chamber. As a result, a CNT 1 electrically-conductive paste was obtained without causing the viscosity failure (a slight failure-like state was observed, but the fluidity of the paste was consistently confirmed).

Next, NMP was added to the dilution having been subjected to the dispersion processing, and an electrically-conductive paste having a CNT 1 concentration of 8.0% by weight was obtained.

Example 6

Kneading was performed in the same manner as that in Example 1, except that, with respect to 100 parts by weight of CNT 1, 124 parts by weight of polyvinylpyrrolidone (manufactured by NIPPON SHOKUBAI CO., LTD., PVP K-30) dissolved at an NV value of 20% in NMP in advance, and 775 parts by weight of NMP were loaded, so that the wetting rate of CNT 1 was 74% (CNT 1 concentration: 10.0% by weight).

1222 parts by weight of NMP with respect to 100 parts by weight of CNT 1 was added to the above obtained kneaded product (CNT 1 concentration: 10.0% by weight) in a paste state so that the CNT 1 concentration was 4.5% by weight, and then dispersion processing was performed by rotating the stirring blade at a high speed of 2000 rpm (2000 min') for two hours in the high-speed shear chamber. As a result, a CNT 1 electrically-conductive paste was obtained without causing the viscosity failure.

Next, NMP was added to the dilution having been subjected to the dispersion processing, and an electrically-conductive paste having a CNT 1 concentration of 4.0% by weight was obtained.

Example 7

Kneading was performed in the same manner as that in Example 1, except that, with respect to 100 parts by weight of CNT 1, 124 parts by weight of polyvinylpyrrolidone (manufactured by NIPPON SHOKUBAI CO., LTD., PVP K-30) dissolved at an NV value of 20% in NMP in advance, and 275 parts by weight of NMP were loaded, so that the wetting rate of CNT 1 was 37% (CNT 1 concentration: 20.0% by weight).

452 parts by weight of NMP with respect to 100 parts by weight of CNT 1 was added to the above obtained kneaded product (CNT 1 concentration: 20.0% by weight) in a paste state so that the CNT 1 concentration was 10.5% by weight, and then dispersion processing was performed by rotating the stirring blade at a high speed of 2000 rpm (2000 min$^{-1}$) for two hours in the high-speed shear chamber. As a result, a CNT 1 electrically-conductive paste was obtained without causing the viscosity failure.

Next, NMP was added to the dilution having been subjected to the dispersion processing, and an electrically-conductive paste having a CNT 1 concentration of 9.8% by weight was obtained.

Example 8

Since the maximum penetration weight of NMP per 1 g of CNT 2 (MWCNT, manufactured by LG Chem, LUCAN BT 1001M. The same applies below) was 15.5 g, 100% of CNT 2 was wet (wetting rate: 100%) when the CNT 2 concentration was 6.1% by weight.

Kneading was performed in the same manner as that in Example 1, except that 502 parts by weight of NMP with respect to 100 parts by weight of CNT 2 was loaded so that the wetting rate of CNT 2 was 37% (CNT 2 concentration: 16.6% by weight).

936 parts by weight of NMP with respect to 100 parts by weight of CNT 2 was added to the above obtained kneaded product (CNT 2 concentration: 16.6% by weight) in a paste state so that the CNT 2 concentration was 6.5% by weight, and then dispersion processing was performed by rotating the stirring blade at a high speed of 2000 rpm (2000 min$^{-1}$) for two hours in the high-speed shear chamber. As a result, a CNT 2 electrically-conductive paste was obtained without causing the viscosity failure.

Next, NMP was added to the dilution having been subjected to the dispersion processing, and an electrically-conductive paste having a CNT 2 concentration of 6.0% by weight was obtained.

Example 9

Kneading was performed in the same manner as that in Example 1, except that, with respect to 100 parts by weight of CNT 2, 124 parts by weight of polyvinylpyrrolidone (manufactured by NIPPON SHOKUBAI CO., LTD., PVP K-30) dissolved at an NV value of 20% in NMP in advance, and 275 parts by weight of NMP were loaded, so that the wetting rate of CNT 2 was 31% (CNT 2 concentration: 20.0% by weight).

676 parts by weight of NMP with respect to 100 parts by weight of CNT 2 was added to the above obtained kneaded product (CNT 2 concentration: 20.0% by weight) in a paste state so that the CNT 2 concentration was 8.5% by weight, and then dispersion processing was performed by rotating the stirring blade at a high speed of 2000 rpm (2000 min') for two hours in the high-speed shear chamber. As a result, a CNT 2 electrically-conductive paste was obtained without causing the viscosity failure.

Next, NMP was added to the dilution having been subjected to the dispersion processing, and an electrically-conductive paste having a CNT 2 concentration of 8.0% by weight was obtained.

Comparative Example 1

Without using the planetary stirring machine, dispersion processing was attempted to be performed by using the stirring blade with the concentrations of CNT 1 and NMP changed. However, the viscosity became high even at a CNT 1 concentration of 4.0% by weight, and the paste did not have fluidity (viscosity failure). When the CNT 1 concentration was decreased to 2.0% by weight, fluidity was able to be ensured.

Comparative Example 2

The amount of NMP was adjusted so that the wetting rate of CNT 1 was 124% (CNT 1 concentration: 5.9% by weight), and kneading (two passes) was performed by using a three-roll mill instead of the planetary stirring machine. The viscosity was measured with the concentration of the kneaded product changed. The viscosity was very high and equivalent to the viscosity of Comparative example 1 and was far from a level at which dispersion processing could be performed with the stirring blade.

Comparative Example 3

The amount of NMP was adjusted so that the wetting rate of CNT 1 was 74% (CNT 1 concentration: 10.0% by weight), and kneading (two passes) was performed by using a three-roll mill instead of the planetary stirring machine. The viscosity was measured with the concentration of the kneaded product changed. The viscosity was very high and equivalent to the viscosity of Comparative example 1 and was far from the level at which dispersion processing could be performed with the stirring blade.

Comparative Example 4

The amount of NMP was adjusted so that the wetting rate of CNT 1 was 37% (CNT 1 concentration: 20.0% by weight), and kneading (one pass, two passes, and five passes) was performed by using a three-roll mill instead of the planetary stirring machine. The viscosity was measured with the concentration of the kneaded product changed. The viscosity was very high and equivalent to the viscosity of Comparative example 1, and an effect of decreasing the viscosity was not observed even with an increased number of passes. The viscosity was far from the level at which dispersion processing could be performed with the stirring blade.

Comparative Example 5

In Comparative example 1, CNT 2 was used instead of CNT 1, and dispersion processing was attempted to be performed by using the stirring blade with the concentrations of CNT 2 and NMP changed. However, the viscosity became high even at a CNT 2 concentration of 4.0% by weight, and the paste did not have fluidity (viscosity failure).

Test Example 1

An electrode binder PVDF (manufactured by KUREHA CORPORATION, KF Polymer L #1120, NV value 12%) and an electric conduction aid acetylene black (hereinafter, AB) (manufactured by Denka Company Limited, "DENKA BLACK") were mixed according to an ordinary method. Then, the resultant mixture was mixed with each of the CNT 1 electrically-conductive pastes respectively obtained in Examples 2, 4, 5, 6, 7, 8, 9, and Comparative example 1. Subsequently, a positive electrode active material LCO (manufactured by NIPPON CHEMICAL INDUSTRIAL CO., LTD., lithium cobalt oxide) was mixed according to an ordinary method, whereby a positive electrode mixture (LCO:PVDF:AB:CNT 1(mass ratio)=94:3:3:0.3) was obtained.

A film of the obtained positive electrode mixture was formed on an aluminum current collector foil (manufactured by The Nilaco Corporation, AL-013225) by using a desktop mini-coater (manufactured by Hohsen Corp., MC-20) and was dried by a hot plate and a vacuum dryer.

When the surface of each of the obtained positive-electrode-mixture electrodes was visually observed, aggregates of CNT 1 were not confirmed in the positive-electrode-mixture electrodes produced from the CNT 1 electrically-conductive pastes of Examples 2, 4, 5, 6, 7, 8, 9. Meanwhile, many aggregates of CNT 1 were confirmed in the positive-electrode-mixture electrode produced from the CNT 1 electrically-conductive paste of Comparative example 1. The positive-electrode-mixture electrode produced from the CNT 1 electrically-conductive paste of Comparative example 1 was not suitable for use in battery evaluation in Test example 2.

From the above, it is understood that each electrically-conductive paste obtained by the manufacturing method of the present invention maintains the dispersed state in the positive electrode mixture and in the coating electrode thereof.

Therefore, according to the manufacturing method of the present invention, an electrically-conductive paste that: contains CNT at a high concentration even with a small amount of the dispersant; has a low viscosity; and is easy to handle can be manufactured. In addition, according to the electrically-conductive paste obtained in the present invention, a positive electrode mixture can be produced by being mixed with a positive electrode active material for a lithium secondary battery.

Test Example 2

A test battery (half-cell) was produced by using each positive-electrode-mixture electrode produced in Test example 1, and a battery evaluation (rate test and cycle test) was performed. The test battery (articles of Examples) was produced in the following manner.

The positive-electrode-mixture electrode produced in Test example 1 was pressed at about 32 kgN by a uniaxial pressing machine, whereby the porosity of the electrode was adjusted to around 30%. While using an electrochemical characteristics measurement cell (manufactured by NIPPON TOMUSERU:K.K., TJ-AC), the positive-electrode-mixture electrode produced in Test example 1 was used as the positive electrode, a metal lithium foil (manufactured by The Honjo Chemical Corporation) was used as the negative electrode, a glass fiber filter paper (manufactured by Whatman, GF/B) was used as the separator, and 1M LiPF6 EC:DEC (1:1 v/v %) (manufactured by KISHIDA CHEMICAL Co., Ltd.) was used as the electrolytic solution, whereby the test battery was produced. As a control article, a test battery in which no CNT 1 electrically-conductive paste was mixed (electric conduction aid using acetylene black (AB) only) was also produced.

After an assembly step using the electrolytic solution and the lithium foil, the procedure was performed in a glove box (manufactured by UNICO LTD, UN-650L) under an argon gas atmosphere.

The porosity of the electrode was calculated from the weight per area, the film thickness, and the true density of the materials.

The properties of the battery were measured as follows.

The produced test battery was connected to a charge/discharge measurement device (manufactured by HOKUTO DENKO CORPORATION, HJ-1001SD8), and a rate test and a cycle test were performed.

In the rate test, charging was performed under constant current control, with the rate fixed to 0.1 C and the end voltage of 4.2 V. Discharging was performed under constant current control, with the rate changed to 0.1 C, 0.2 C, 0.5 C, 1 C, 2 C, 3 C, 5 C, 7 C, 10 C and the end voltage of 3.0 V.

In the cycle test, while constant current control was basically performed with the rate set to 1 C and the end voltage of 4.3 V to 3.0 V, charging and discharging were repeated about 200 cycles. However, in the initial 5 cycles and the 51st, 101st, 151st, 201st cycles, charging and discharging were performed at the rate of 0.1 C.

The obtained rate test results are shown in Table 1, and the obtained cycle test results are shown in Table 2.

TABLE 1

| Electric conduction aid | Weight per area (mg) | Film thickness (μm) | Porosity (%) | Discharge capacity @0.2 C (mAhg$^{-1}$) | Discharge capacity @3 C (mAhg$^{-1}$) |
| --- | --- | --- | --- | --- | --- |
| AB only | 31.8 | 50 | 26 | 133.7 | 70.4 |
| AB + Example 2 | 32.0 | 53 | 29 | 137.3 | 99.0 |
| AB + Example 4 | 29.0 | 48 | 29 | 132.9 | 91.6 |
| AB + Example 5 | 32.2 | 54 | 30 | 133.9 | 76.2 |
| AB + Example 6 | 30.1 | 49 | 27 | 136.9 | 78.6 |
| AB + Example 7 | 25.8 | 44 | 31 | 138.1 | 100.1 |
| AB + Example 8 | 29.7 | 49 | 27 | 136.8 | 73.3 |
| AB + Example 9 | 27.1 | 48 | 34 | 137.5 | 93.8 |

TABLE 2

| Electric conduction aid | Weight per area (mg) | Film thickness (μm) | Porosity (%) | Discharge capacity @100th cycle (mAhg$^{-1}$) | Discharge capacity @101st cycle (mAhg$^{-1}$) |
| --- | --- | --- | --- | --- | --- |
| AB only | 31.7 | 50 | 26 | 68.0 | 137.4 |
| AB + Example 2 | 29.4 | 50 | 31 | 73.0 | 131.9 |
| AB + Example 4 | 32.3 | 55 | 32 | 95.0 | 137.3 |
| AB + Example 5 | 27.5 | 46 | 30 | 120.2 | 143.9 |
| AB + Example 6 | 28.9 | 49 | 30 | 123.5 | 150.4 |
| AB + Example 7 | 26.9 | 43 | 27 | 122.2 | 151.2 |
| AB + Example 8 | 28.9 | 50 | 32 | 112.2 | 142.7 |
| AB + Example 9 | 26.1 | 45 | 32 | 116.7 | 148.5 |

With reference to the results shown in Table 1, in the articles of Examples (AB+Examples 2 to 9), the discharge capacity at 3 C was improved to about 104 to 142% by merely adding a little less than 0.3% by weight of CNT, as compared with that of the control article (AB only).

With reference to the results shown in Table 2, when charging and discharging were repeated, in the articles of Examples (AB+Examples 2 to 9) the discharge capacity at the 100th cycle became about 107 to 182% by merely adding a little less than 0.3% by weight of CNT, as compared with that of the control article (AB only).

From the above results, it is understood that: the electrically-conductive paste obtained in the present invention is used, thereby efficiently improving the discharge capacity of the positive electrode mixture; and efficiently manufacturing a desired electrode member excellent in electron conductivity.

Example 10

Since the maximum penetration weight of NMP per 1 g of CNT 3 (SWCNT, manufactured by OCSiAl, TUBALL. The same applies below) was 8.1 g, 100% of CNT 3 was wet (wetting rate: 100%) when the CNT 3 concentration was 11.0% by weight.

218 parts by weight of NMP with respect to 100 parts by weight of CNT 3 was loaded so that the wetting rate of CNT 3 was 35% (CNT 3 concentration: 31.4% by weight). Then, the planetary stirring machine was operated at about 30° C. and 35 rpm (35 min$^{-1}$) for four hours to perform kneading, whereby a kneaded product having a CNT 3 concentration of 31.4% by weight was obtained. To this, 62.5 parts by weight of polyvinylpyrrolidone (manufactured by NIPPON SHOKUBAI CO., LTD.) dissolved in NMP at an NV value of 40% in advance was added, and the planetary stirring machine was operated at about 30° C. and 35 rpm (35 min$^{-1}$) for four hours to perform kneading, whereby a kneaded product having a CNT 3 concentration of 26.2% by weight was obtained.

2476 parts by weight of NMP with respect to 100 parts by weight of CNT 3 was added to the above obtained kneaded product (CNT 3 concentration: 26.2% by weight) in a paste state so that the CNT 3 concentration was 3.5% by weight, and then dispersion processing was performed by rotating the stirring blade at a high speed of 2000 rpm (2000 min$^{-1}$) for two hours in the high-speed shear chamber. As a result, a CNT 3 electrically-conductive paste was obtained without causing the viscosity failure.

Next, NMP was added to the dilution having been subjected to the dispersion processing, and an electrically-conductive paste having a CNT 3 concentration of 3.0% by weight was obtained.

Example 11

Since the maximum penetration weight of NMP per 1 g of CNT 4 (MWCNT, manufactured by JEIO, JENOTUBE 6A. The same applies below) was 16.4 g, 100% of CNT 4 was wet (wetting rate: 100%) when the CNT 4 concentration was 5.7% by weight.

443 parts by weight of NMP with respect to 100 parts by weight of CNT 4 was loaded so that the wetting rate of CNT 4 was 31% (CNT 4 concentration: 18.4% by weight). Then, the planetary stirring machine was operated at about 30° C. and 35 rpm (35 min') for 21 hours to perform kneading, whereby a kneaded product having a CNT 4 concentration of 18.4% by weight was obtained.

789 parts by weight of NMP with respect to 100 parts by weight of CNT 4 was added to the above obtained kneaded product (CNT 4 concentration: 18.4% by weight) in a paste state so that the CNT 4 concentration was 7.5% by weight, and then dispersion processing was performed by rotating the stirring blade at a high speed of 2000 rpm (2000 min') for two hours in the high-speed shear chamber. As a result, a CNT 4 electrically-conductive paste was obtained without causing the viscosity failure.

Next, NMP was added to the dilution having been subjected to the dispersion processing, and an electrically-conductive paste having a CNT 4 concentration of 7.0% by weight was obtained.

Example 12

With respect to 100 parts by weight of CNT 4, 125 parts by weight of polyvinylpyrrolidone (manufactured by NIPPON SHOKUBAI CO., LTD., PVP K-30) dissolved in NMP at an NV value of 20% in advance, and 318 parts by weight of NMP were loaded so that the wetting rate of CNT 4 was 31% (CNT 4 concentration: 18.4% by weight). Then, the planetary stirring machine was operated at about 30° C. and 35 rpm (35 min') for 18 hours to perform kneading, whereby a kneaded product having a CNT 4 concentration of 18.4% by weight was obtained.

995 parts by weight of NMP with respect to 100 parts by weight of CNT 4 was added to the above obtained kneaded product (CNT 4 concentration: 18.4% by weight) in a paste state so that the CNT 4 concentration was 6.5% by weight, and then dispersion processing by rotating the stirring blade at a high speed of 2000 rpm (2000 min') for two hours in the high-speed shear chamber. As a result, a CNT 4 electrically-conductive paste was obtained without causing the viscosity failure.

Next, NMP was added to the dilution having been subjected to the dispersion processing, and an electrically-conductive paste having a CNT 4 concentration of 6.0% by weight was obtained.

Using the electrically-conductive paste obtained in each of Examples 10, 11, 12, a positive-electrode-mixture electrode was produced based on the method according to Test example 1. Aggregates were not observed in the positive electrode mixture, and the dispersed state of CNT was maintained.

Therefore, according to the manufacturing method of the present invention, it is possible to manufacture, in either case where MWCNT or SWCNT is used as CNT, an electrically-conductive paste that: contains CNT at a high concentration even when the amount of the dispersant is small; has a low viscosity; and is easy to handle. Further, in either case where MWCNT or SWCNT is used as CNT, it is possible to produce a positive electrode mixture by mixing the electrically-conductive paste obtained in the present invention with a positive electrode active material for a lithium-ion secondary battery.

The invention claimed is:

1. A method for manufacturing an electrically-conductive paste, the method comprising:
bringing carbon nanotubes ("CNT") and a solvent into contact with each other so that a wetting rate represented by a formula (1) below is 25 to 125%;
kneading, by using a planetary stirring machine, a mixture containing the CNT and the solvent, to obtain a kneaded product in a paste state, the mixture being obtained by impregnating the CNT with the solvent; and
performing dispersion processing on a dilution obtained by mixing a solvent into the kneaded product obtained, wherein the wetting rate (%)=$A/B \times 100$     (1), where A is a concentration of the CNT, when the solvent has penetrated to a maximum extent, and is calculated by a formula below, $A$ (%)=1g of the $CNT$/(1g of the $CNT$+a maximum penetration weight [g] of the solvent per 1g of the $CNT$)×100, and B is a concentration of the CNT in the mixture, and is calculated by a formula below, $B$ (%)=a weight of the $CNT$ [g]/a weight of the mixture [g]×100;

wherein the dispersion processing is performed by at least one of: a stirring machine that rotates a stirring blade at a high speed, thereby applying a shearing force to the dilution; and a stirring machine that causes, while mechanically stirring a natural or synthetic medium in a container filled with the medium, the dilution to flow back or pass through the medium to be dispersed.

2. The method for manufacturing the electrically-conductive paste, according to claim 1, wherein
a content of a dispersant in each of the mixture, the kneaded product, and the dilution is less than 30 parts by weight with respect to 100 parts by weight of the CNT.

3. The method for manufacturing the electrically-conductive paste, according to claim 1, the method further comprising:
mixing a solvent into the dilution having been subjected to the dispersion processing, to adjust the concentration of the CNT.

* * * * *